Figure 4:
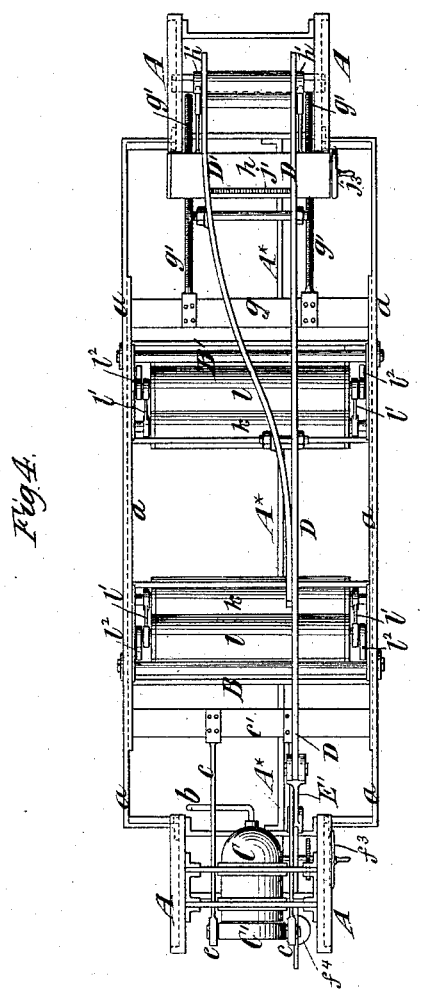

(No Model.)  4 Sheets—Sheet 1.
J. F. O'CONNOR.
MACHINE FOR TESTING CANVAS AND OTHER FABRICS.
No. 314,465. Patented Mar. 24, 1885.
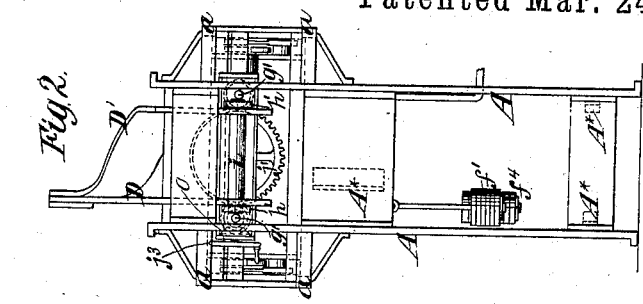
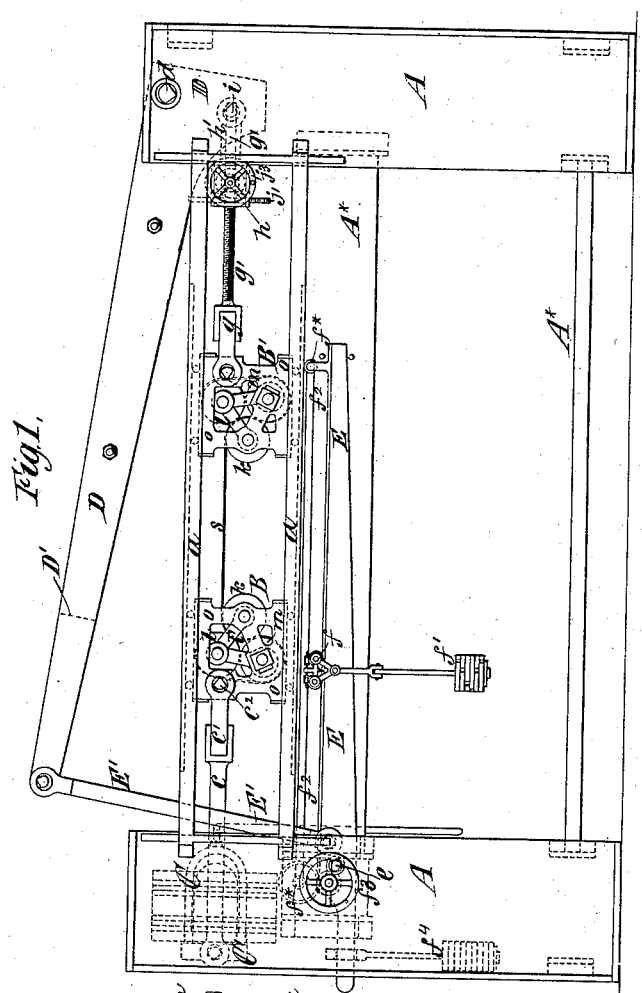
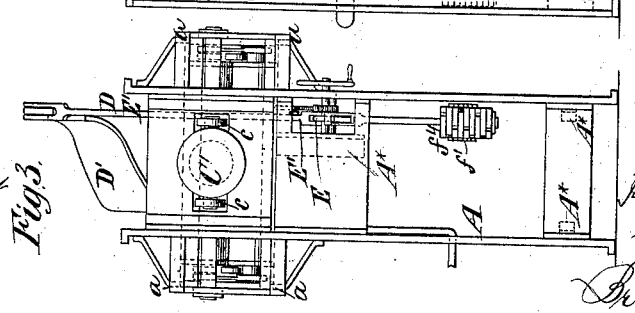
Witnesses:
Matthew Pollok
C. E. Sundgren
Inventor:
John Fred. O'Connor
by his Attys,
Brown & Hall (No Model.) 4 Sheets—Sheet 2.

J. F. O'CONNOR.
MACHINE FOR TESTING CANVAS AND OTHER FABRICS.

No. 314,465. Patented Mar. 24, 1885.

Witnesses:
Matthew Pollak
C. Sundgren

Inventor:
John Frederick O'Connor
Cyrus Attys,
Brown & Hall

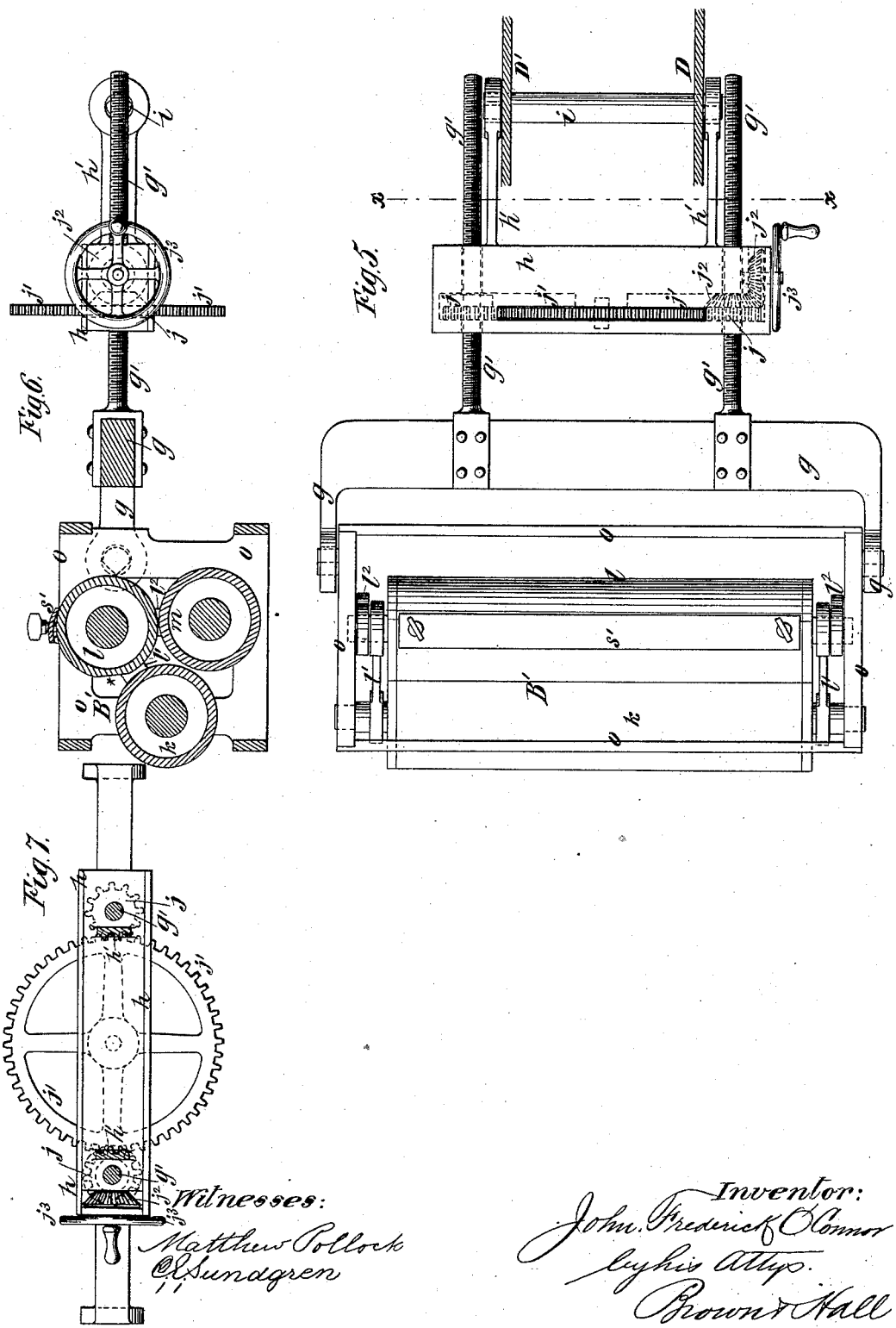

(No Model.) 4 Sheets—Sheet 4.
J. F. O'CONNOR.
MACHINE FOR TESTING CANVAS AND OTHER FABRICS.
No. 314,465. Patented Mar. 24, 1885.
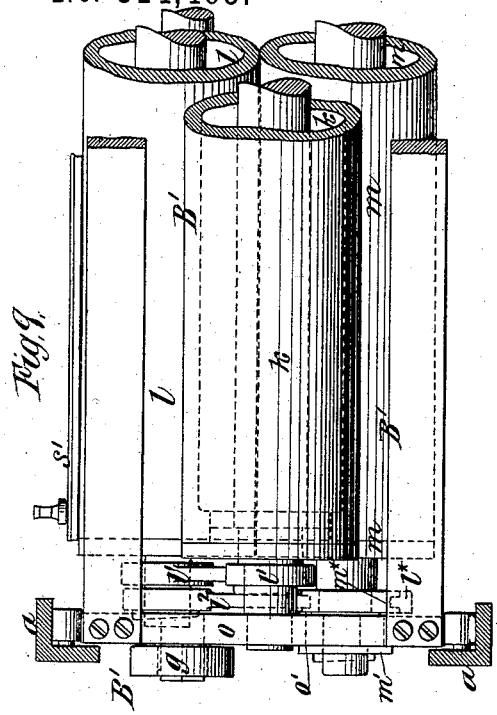
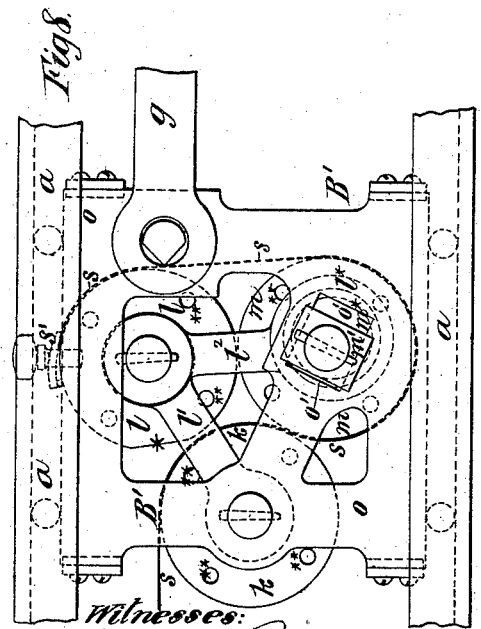
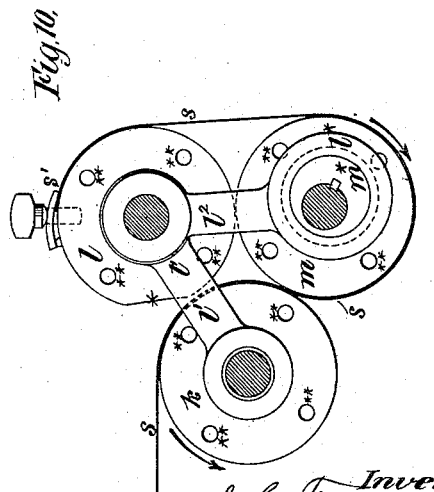

UNITED STATES PATENT OFFICE.

JOHN F. O'CONNOR, OF NEW YORK, N. Y.

MACHINE FOR TESTING CANVAS AND OTHER FABRICS.

SPECIFICATION forming part of Letters Patent No. 314,465, dated March 24, 1885.

Application filed June 21, 1884. (No model.)

*To all whom it may concern:*

Be it known that I, JOHN FREDERICK O'CONNOR, of the city and county of New York, in the State of New York, have invented a new and useful Improvement in Machines for Testing Canvas and other Fabrics, of which the following is a specification.

As most commonly constructed for the Navy Department, machines for testing canvas are usually adapted to take a narrow strip of about an inch wide, more or less, cut from the piece of canvas; and the object of my invention is to provide a machine adapted to receive and test a piece of canvas of full width.

In carrying out my invention I employ two grips adapted to take hold of opposite ends of a piece of canvas, and to hold the same uniformly throughout its width. These grips are movable along stationary tracks or ways provided in the machine, and with one grip is connected a hydraulic cylinder and piston whereby a pulling force may be exerted on the fabric. With the other grip is connected a beam or bell-crank lever, the long arm of which is connected with a steelyard-beam, and on said steelyard-beam is a weighted trolley or carriage, which is moved along the beam by well-known mechanism.

The invention consists in novel combinations of parts, hereinafter described, and pointed out in the claims, and includes an adjustable connection, hereinafter described, between the main beam and the grip, which is attached thereto, whereby the machine is adapted for testing pieces of canvas of different lengths; and it also consists in a novel construction of grip, which I prefer to employ at each end of the piece of canvas, and which is fully hereinafter described.

In the accompanying drawings, Figure 1 is a side elevation of my machine. Fig. 2 is an end view taken from that end of the machine at which the main beam is fulcrumed. Fig. 3 is an end elevation taken from the opposite end of the machine. Fig. 4 is a plan of the machine. Fig. 5 is a plan of certain parts, on a larger scale, illustrating the adjustable connection between the beam and its attached grip. Fig. 6 is a side view of the parts shown in Fig. 5. Fig. 7 is a transverse section on the dotted line $x\ x$, Fig. 5. Fig. 8 is a side view of one of the grips on a larger scale. Fig. 9 is a front view of one end portion thereof, and Fig. 10 is a detail view illustrating the three rollers of a grip and their connections.

The same letters of reference designate the same or corresponding parts in all the figures.

A A designate the end frames of the machine, which are connected by longitudinal beams or stretchers A*, so as to form a stable and secure framing, which is formed largely of plate metal and angle-iron.

At each side of the machine are longitudinal tracks or ways $a$, which support two grips, B B', and on which the said grips may slide or move. These grips are preferably supported by or provided with friction wheels or rollers, and their construction will be particularly hereinafter described.

At the left-hand end of the machine, as shown in Fig. 1, is a hydraulic cylinder, C, which is to be supplied with water through a pipe, $b$, from any suitable pump, (not here shown,) and from the outer end of this cylinder projects a piston or plunger, C', which is connected by links or rods $c$ with a bail or cross-piece, $c'$, on the grip B. This bail or cross-piece is connected by knife-edge pivots $c^2$ with the frame of the grip B, and when the piston or plunger is forced outward from the cylinder the grip B is pulled toward that end of the machine. At the opposite end of the machine is supported, by knife-edge bearings or pivots $d$, the main beam D, which constitutes a bell-crank lever, and is composed of a straight plate or piece extending longitudinally of the machine at one side thereof and a bent or curved plate, D', united thereto, as shown in Fig. 4.

At the end of the machine at which is the hydraulic cylinder C is pivoted a steelyard-beam, E. This steelyard-beam also has knife-edge bearings or pivots $e$, and is connected at a point very near its fulcrum by a rod, E', with the end of the main beam D.

The advantage of having the beam D constructed as described is that the latter is afforded a proper length of fulcrum, and the rod E' can extend downward at the side of the machine and out of the movable parts of the machine.

On the steelyard-beam E is mounted a running or movable trolley, $f$, from which is suspended a weight, $f'$, and to which is connected an endless belt or chain, $f^2$, carried by suitable small wheels, $f^*$, and capable of being moved by a suitable hand-wheel, $f^3$.

The means for moving the trolley and its weight along the beam E in themselves form no part of my invention, and no further description thereof is needed. Beyond its fulcrums the beam E is provided with the usual counter-weight, $f^4$, which also counterbalances the main lever D and all parts of the lever mechanism.

As before stated, the main beam D constitutes a bell-crank lever and the devices connecting the shorter arm thereof with the grip B', as best shown in Figs. 5, 6, and 7, but also in Figs. 1 and 4.

To the frame of the grip B' is attached, by means of knife-edge bearings or otherwise, a bail or bar $g$, to which are secured two screws, $g'$, extending rearward and parallel with each other. These screws $g'$ extend through a box or transverse hollow frame, $h$, from which arms or bars $h'$ project rearward, as shown in Fig. 5. The arms $h'$ are connected by knife-edge or other pivots or bearings with a cross pin or bar, $i$, secured in the plates forming the beam D D', and are therefore connected with the short arm of the said beam or lever.

In the box or frame $h$ are journaled spur-pinions $j\ j$, which constitute nuts fitting the screws $g'\ g'$, and an intermediate spur-wheel, $j'$, which engages with said pinions $j$, and so connects them as to insure their rotation in the same directions and simultaneously. In the box or frame $h$ is also journaled a bevel-pinion, $j^2$, gearing with bevel-teeth on one of the pinions $j$, and capable of being turned by a hand-wheel, $j^3$. When the pinion $j^2$ is turned, the pinions $j$ are both turned upon the non-rotary screws $g'$ in the same directions, and thereby the connection between the grip B' and the short arm of the beam D may be shortened or lengthened to adapt the machine for a longer or shorter piece of canvas.

The construction of the grips forms an important feature of my invention, and is illustrated most clearly in Figs. 8, 9, and 10.

A description of one grip applies to both.

Each grip consists, essentially, of three rollers, $k\ l\ m$, and their connections. The rollers are preferably hollow, and have shafts extending through them, or are provided with journals at their ends. At each end of the rollers are end frames, $o$, which may be of any suitable form, and in these frames the journals of the roller $k$ are held in fixed bearings. The roller $m$ is fitted to boxes $m'$, which are capable of sliding in slots $o'$ in the frames $o$, and thus allow the roller $m$ to move toward and from the roller $k$.

The roller $l$ is journaled in links $l'$, which connect it with the roller $k$, and are of fixed length, and in links $l^2$, which connect it with the roller $m$. The links $l^2$ do not hold the rollers $l\ m$ at a fixed distance apart; but the lower ends of said links are formed with eccentric hoops $l^*$, which are fitted to eccentric hubs $m^*$ on the ends of the roller $m$. The canvas $s$ is passed over the roller $k$, under the roller $m$, and thence upward and partly around the roller $l$, to which it is secured across the entire width of the canvas by a clamp, $s'$, or other means. When strain comes upon the canvas, it pulls the roller $m$ toward the roller $k$, the movement of the boxes $m'$ in the inclined slots $o'$ providing for such movement, and the pull of the canvas also rotates the roller $m$.

It will be readily understood that any rotation of the roller $m$ will cause the eccentric hub $m^*$ at the ends thereof to act upon the eccentric-straps $l^*$ and links $l^2$, and through these the roller $l$ is pulled down and made to bite upon the top of the roller $m$, and to thereby stop its rotation. The stronger the tendency of the roller $m$ to turn the greater will be the bite of the roller $l$ upon the top of the roller $m$, and hence the greater will be the resistance opposed to the rotation of the roller $m$.

The roller $m$ may be allowed sufficient movement toward the roller $k$ to bite the canvas $s$ between the two; or the slots $o'$ may be constructed so as to stop the boxes $m'$ before the roller $m$, by its movement toward the roller $k$, produces a bite on the canvas.

The rollers may be provided in their ends with holes $*\ *$, in which a bar or handle may be inserted for turning them.

Not only is the grip described very secure, but another great advantage which it has is that when strain is removed from a piece of canvas the rollers are left free, and the detachment of the canvas from the grip is easy.

The roller $l$ may have a flattened portion, $*$, to facilitate the introduction of the canvas between the rollers $k\ l$ and over the former.

When a piece of canvas has been secured by the grips, the trolley and running weight are adjusted on the steelyard-beam E to produce the desired strain on the canvas. If the canvas is strong enough to resist the test-strain, then the trolley and running weights are moved outward, and strain is applied until the canvas tears. The position of the trolley and running weight will then determine the tearing-strain.

Although more particularly intended for testing canvas, my improved machine may also be employed for testing other fabrics.

What I claim as my invention, and desire to secure by Letters Patent, is—

1. In a fabric-testing machine, the combination, with a main frame and two grips, B B', in which opposite ends of a piece of fabric may be secured, of a cylinder and piston at one end of the frame, connected with the grip B, for putting strain on the fabric, the beam D, pivoted at the other end of the frame, adjustable connections between the grip B' and the beam for adjusting the grip to suit fabrics of different lengths, the steelyard-beam E, and the rod E', connecting the beams D and E, the weighted trolley $f$, and connections for moving it, substantially as herein described.

2. The combination, with the grip B and an actuating-cylinder and piston connected therewith, of the grip B', the non-rotary screws $g'$, extending therefrom, the beam D, the movable box or frame $h$, and arms $h'$, connecting it with said beam, the spur-pinions $j$, forming nuts fitting said screws, and one provided with bevel-teeth, the intermediate wheel, $j'$, and the operating pinion and handle $j^2 j^3$, all substantially as herein described.

3. The combination, with the grip-frame, of a roller, $k$, journaled therein, a roller, $m$, around which a fabric is to be passed, a roller, $l$, to which the end of the fabric is to be clamped, and eccentric connections between the rollers $l$ $m$, whereby the roller $l$ will be drawn down and caused to bite upon the roller $m$ by any rotation of the latter, substantially as herein described.

4. The combination, with the grip-frame provided with inclined slots $o'$, of the roller $k$, journaled in said frame, the roller $m$, having boxes movable in said slots, and eccentric hubs $m^*$, the roller $l$, provided with a clamp for the fabric, the links $l'$, wherein the roller $l$ is journaled, and the eccentric link-connections $l^2$ $l^*$, between the rollers $l$ $m$, all substantially as herein described.

JNO. F. O'CONNOR.

Witnesses:
FREDK. HAYNES,
C. E. W. DONALD.